United States Patent
Steele et al.

(10) Patent No.: US 6,314,458 B1
(45) Date of Patent: *Nov. 6, 2001

(54) APPARATUS AND METHOD FOR COMMUNICATION BETWEEN MULTIPLE BROWSERS

(75) Inventors: Douglas W. Steele, Fort Collins; Todd M. Goin, Loveland; Craig W. Bryant, Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,260

(22) Filed: Mar. 31, 2000

Related U.S. Application Data

(63) Continuation of application No. 09/061,360, filed on Apr. 15, 1998, now Pat. No. 6,065,051.

(51) Int. Cl.$^7$ ........................................................ G06F 13/00
(52) U.S. Cl. ........................... 709/219; 709/203; 709/223; 709/313
(58) Field of Search .................................... 709/203, 217, 709/219, 223, 224, 225, 227, 313, 329; 707/10, 104

(56) References Cited

U.S. PATENT DOCUMENTS

| | | | |
|---|---|---|---|
| 5,388,196 | 2/1995 | Pajak et al. | 345/329 |
| 5,644,768 | 7/1997 | Periwal et al. | 709/102 |
| 5,758,355 | 5/1998 | Buchanan | 707/201 |
| 6,061,692 | * 5/2000 | Thomas et al. | 707/200 |
| 6,141,759 | * 10/2000 | Braddy | 713/201 |

* cited by examiner

*Primary Examiner*—Viet D. Vu

(57) ABSTRACT

An apparatus and method for providing flexible communications of data modification of Web resources between client browsers, where the Web resources are on a server. In particular, the apparatus and method are accomplished by having an application program ascertain if potentially shared database data was updated. If potentially shared database data was updated, then the application program establishes a connection to a security server and transmits a database change notice to the security server. The security server receives the database change notice and checks its sign-on list of all the client browsers currently active and sends a database change notice to all client user interface browsers currently connected to the security server. All client user browsers, upon receiving a database change notice, display the database change notice or change data within the client user browser, thereby voiding the utilization of stale database data in the client user browser.

14 Claims, 9 Drawing Sheets

APPARATUS AND METHOD FOR COMMUNICATION BETWEEN MULTIPLE BROWSERS

CROSS REFERENCE TO RELATED APPLICATION

This application is a continuation of application entitled "SYSTEM AND METHOD FOR COMMUNICATION BETWEEN MULTIPLE BROWSERS," Ser. No. 09/061,360, filed Apr. 15, 1998, now U.S. Pat. No. 6,065,051 and incorporated herein by reference.

BACKGROUND OF THE INVENTION

1. Field of the Invention

The present invention generally relates to computers and software, and more particularly, to the apparatus and method for providing flexible communication of data modification of Web resources between multiple client browsers, where the Web resources are on a server.

2. Description of Related Art

As known in the art, the Internet is a world-wide collection of networks and gateways that use the TCP/IP suite of protocols to communicate with one another. At the heart of the Internet is a backbone of high speed data communication lines between major nodes or host computers consisting of thousands of commercial government educational and other computer systems that route data and messages.

World Wide Web (WWW) refers to the total set of interlinked hypertext documents residing on hypertext transfer protocol (HTTP) servers all around the world. Documents on the WWW, called pages or Web pages, are written in hypertext mark-up language (HTML) identified by uniform resource locators (URL) that specify the particular machine and pathname by which a file can be accessed and transmitted from node to node to the end user under HTTP. A Web site is a related group of these documents and associated files, scripts, subprocedures, and databases that are served up by an HTTP server on the WWW.

Users need a browser program and an Internet connection to access a Web site. Browser programs, also called "Web browsers," are client applications that enable a user to navigate the Internet and view HTML documents on the WWW, another network, or the user's computer. Web browsers also allow users to follow codes called "tags" imbedded in an HTML document, which associate particular words and images in the document with URLs so that a user can access another file that may be half way around the world, at the press of a key or the click of a mouse.

These files may contain text (in a variety of fonts and styles), graphic images, movie files, and sounds as well as java applets, perl applications, other scripted languages, active X-controls, or other small imbedded software programs that execute when the user activates them by, for example, clicking on a link. Scripts are applications that are executed by a HTTP server in response to a request by a client user. These scripts are invoked by the HTTP daemon to do a single job, and then they exit.

One type of script is a common gateway interface (CGI) script. Generally, a CGI script is invoked when a user clicks on an element in a Web page, such as a link or image. CGI scripts are used to provide interactivity in a Web page. CGI scripts can be written in many languages including C, C++, and Perl. A CGI-BIN is a library of CGI scripts applications that can be executed by a HTTP server.

A key difficulty with communication between client browsers is caused because the client browser will not create a network connection to any computer other than the one from which the client browser code itself was loaded. Therefore, if a client browser changes data in a Web resource that is being shared or accessible by other browsers, the ther browsers will not be made aware of the Web resource data change.

However, until now, applications running in browsers have lacked the ability to notify other browsers running the same application of changes to their underlying database.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus and method for providing flexible communications of data modification of Web resources between client browsers, where the Web resources are on a server.

In accordance with one embodiment of the present invention, a client user interface (browser) makes the call to a server application for service. The server application verifies authorization and then determines which CGI-BIN application program can perform the requested service. The server application invokes the CGI-BIN application program to execute the requested program. The CGI-BIN application program receives the program name and arguments, then executes the requested program and returns the output to the server application. The CGI-BIN application program then ascertains if database data, accessible to multiple browsers, was updated. If database data was updated, then the CGI-BIN application program establishes a connection to a security server and transmits a database change notice to the security server.

The security server receives the database change notice and checks its sign-on list of all the client browsers currently active. The security server requires all client browsers that request access to the database to sign-on (i.e. register with) to the security server before access to the database is granted. The security server then sends a database change notice to all client user interface browsers currently connected to the security server.

All client user browsers, upon receiving a database change notice, then display the database change notice and/or change data within the client user browser. This method of notification and/or data update avoids the utilization of stale database data in the client user browser.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
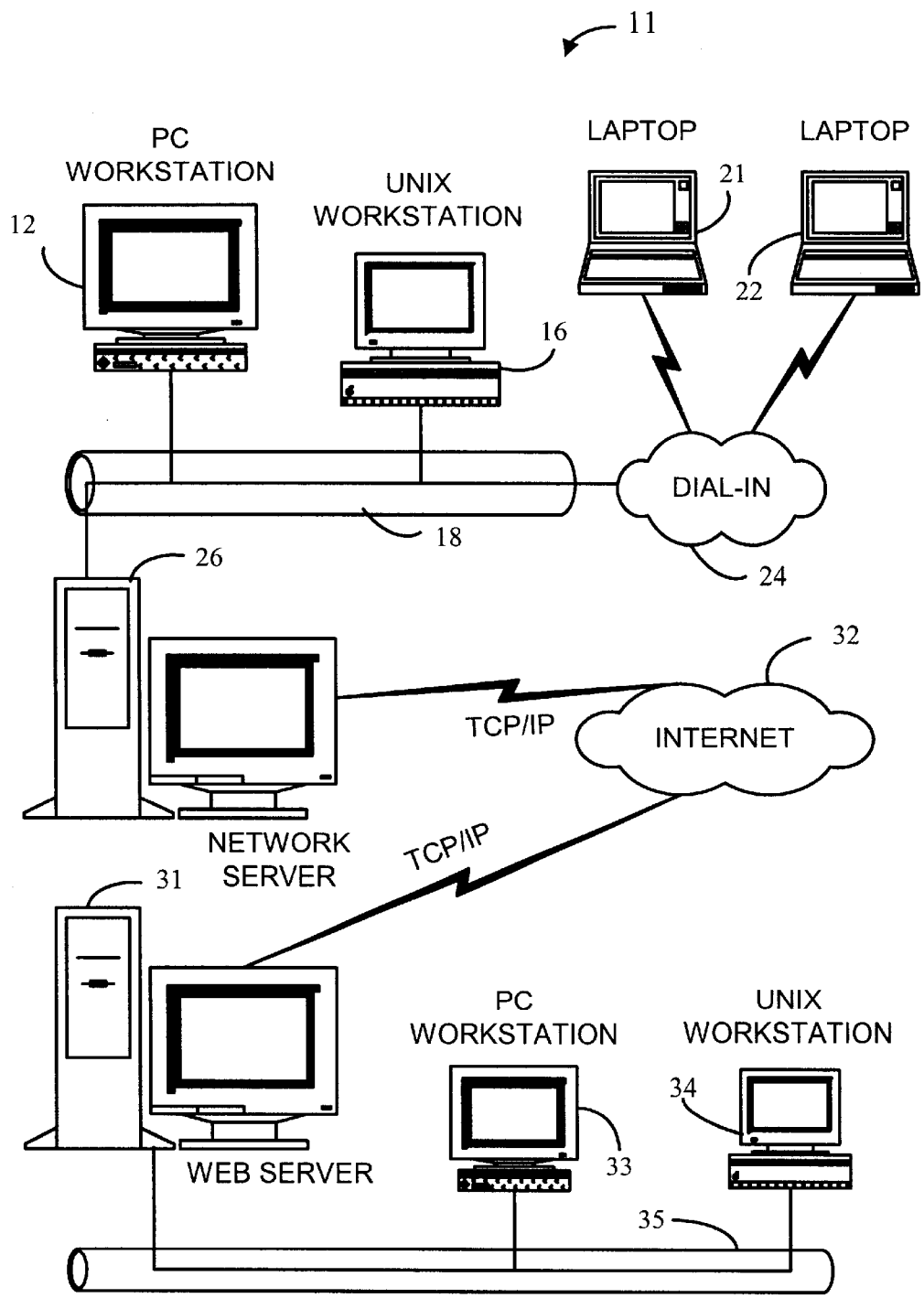
FIG. 1 is a block diagram of the client/server system utilizing the Internet.

Turning now to the drawings, FIG. 1 is a block diagram of just one system configuration that illustrates the flexibility, expandability, and platform independence of the present invention. While the system configuration could take many forms, the diagram of FIG. 1 illustrates a plurality of diverse workstations 12, 14 and 16 directly connected to a network, for example, but not limited to, a LAN 18. Additional workstations 21, 22 may similarly be remotely located and in communication with the network 18 through a dial-in or other connection 24. Each of the workstations in FIG. 1 are uniquely illustrated to emphasize that workstations may comprise a diverse hardware platform.

As is well known, browser applications are provided and readily available for a variety of hardware platforms. Browsers are most commonly recognized for their utility for accessing information over the Internet 32. As aforementioned, a browser is a device or platform that allows a user to view a variety of service collections. The browser retrieves information from a Web server 31 or network server 26 using HTTP, then interprets HTML code, formats, and displays the interpreted result on a workstation display.

Additional workstations 33 and 34 may similarly be located and in communication with the Web servers 31 for access to Web pages on the local server and the Internet. Workstations 33 and 34 communicate with the Web server 31 on a LAN network 35. Networks 18 and 35 may be, for example, Ethernet type networks, also known as 10 BASE 2, 10 BAS 5, 10 BSAF, 10 BAST, BASE BAN network, CO-EX cable, and the like.

Figure 2:
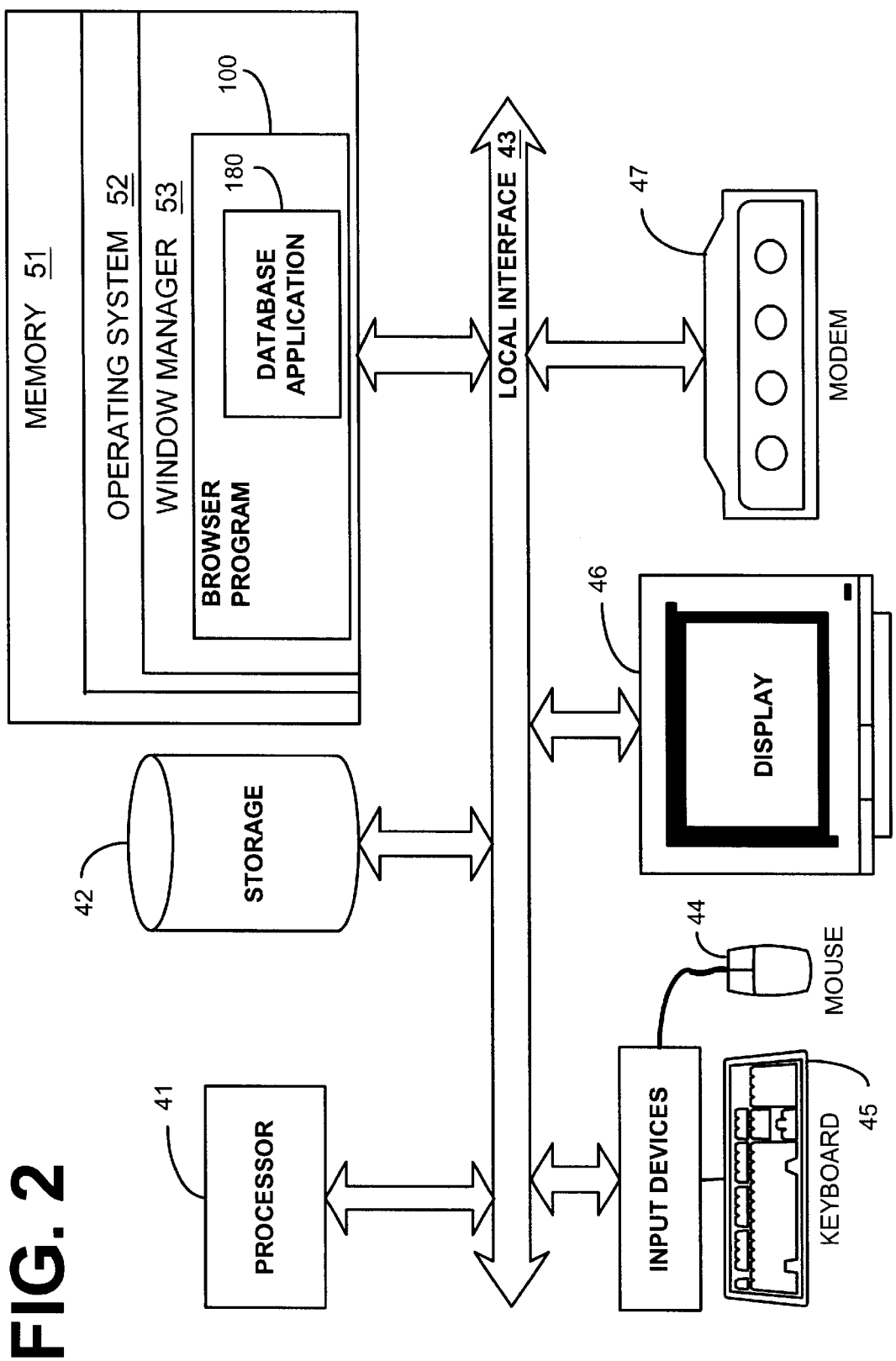
FIG. 2 is a block diagram illustrating a browser program, with a database update routine, situated within a computer readable medium, for example, in a computer system of the client systems.

As illustrated in FIG. 2 client systems today generally include only a browser program 100 (e.g., Netscape, Internet Explorer, or other browser program) for use in accessing locations on a network 11. These browser programs 100 reside in computer memory 51 and access communication facilities modem 47 to transport the user to other resources connected to the network 11. In order to find a resource, the user should know the network location of the resource denoted by a network location identifier or URL. These identifiers are often cryptic, following very complex schemes and formats in their naming conventions.

Systems today identify, access, and process these resources desired by a user by using the processor 41, storage device 42, and memory 51 with an operating system 52 and window manager 53. The processor accepts data from memory 51 and storage 42 over the bus 43. Direction from the user can be signaled by using the input devices mouse 44 and keyboard 45. The actions input and result output are displayed on the display terminal 46.

The first embodiment of the present invention involves the browser program 100. The browser program 100 is the software that interacts with the server to obtain the requested data and functionality requested by the client user. The client browser program 100 and database update routine 180 will be described hereafter in detail with regard to FIGS. 4, 5, 6 and 10.

Figure 3:
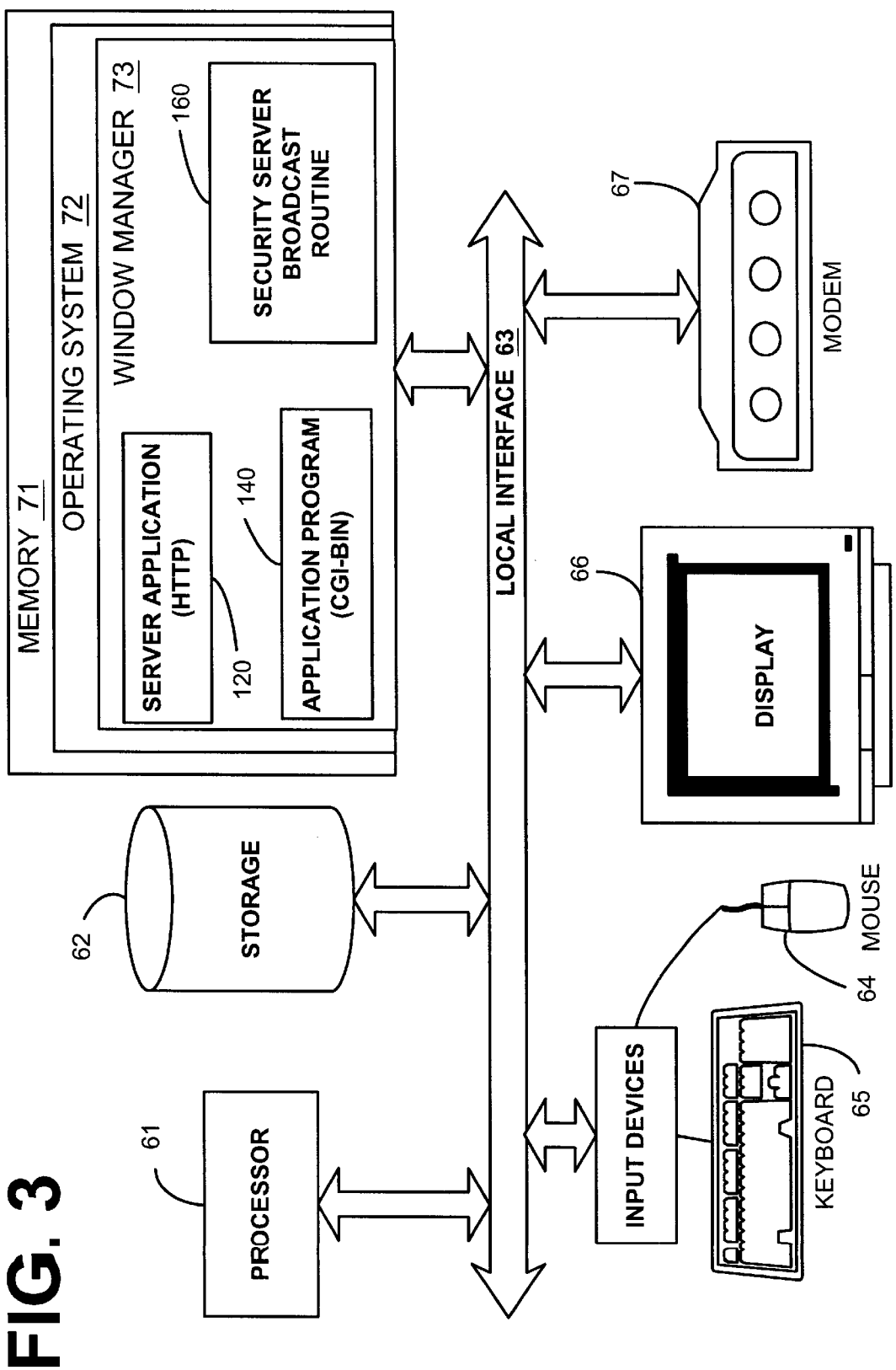
FIG. 3 is a block diagram illustrating a server's service application program, the CGI-BIN program and the security server broadcast routine situated within a computer readable medium, for example, in a computer system of the server systems.

Illustrated in FIG. 3 is the architecture implementing the Web Server 31 and the network server 26. The principal difference between the servers 31 and 26 and the clients 12, 16, 21, 22, 33 and 34, illustrated in FIG. 1, are that the client systems interface to the user and request the functionality through the browser program 100, while the servers 26 and 31 provide the services requested by the client systems utilizing the server application program 120, the security server 160, and CGI-BIN application program 140.

Otherwise, the functionality of processor 61, storage 62, mouse 64, keyboard 65, display 66, and modem 67 are essentially the same as corresponding items of FIG. 2 described above. As known in the art, the client systems 12, 14, 16, 21, 22, 33 and 34, and servers 26 and 31, may reside on the same physical machine.

The principal difference in the servers is that the memory 71 interacting with the operating system 72 and the window manager 73 provide the services requested by the client utilizing the server application 120, CGI-BIN application program 140, and security server 160. Server application 120, CGI-BIN application program 140, and security server 160 will herein be defined in more detail with regard to FIG. 4 and FIGS. 7, 8 and 9.

Figure 4:
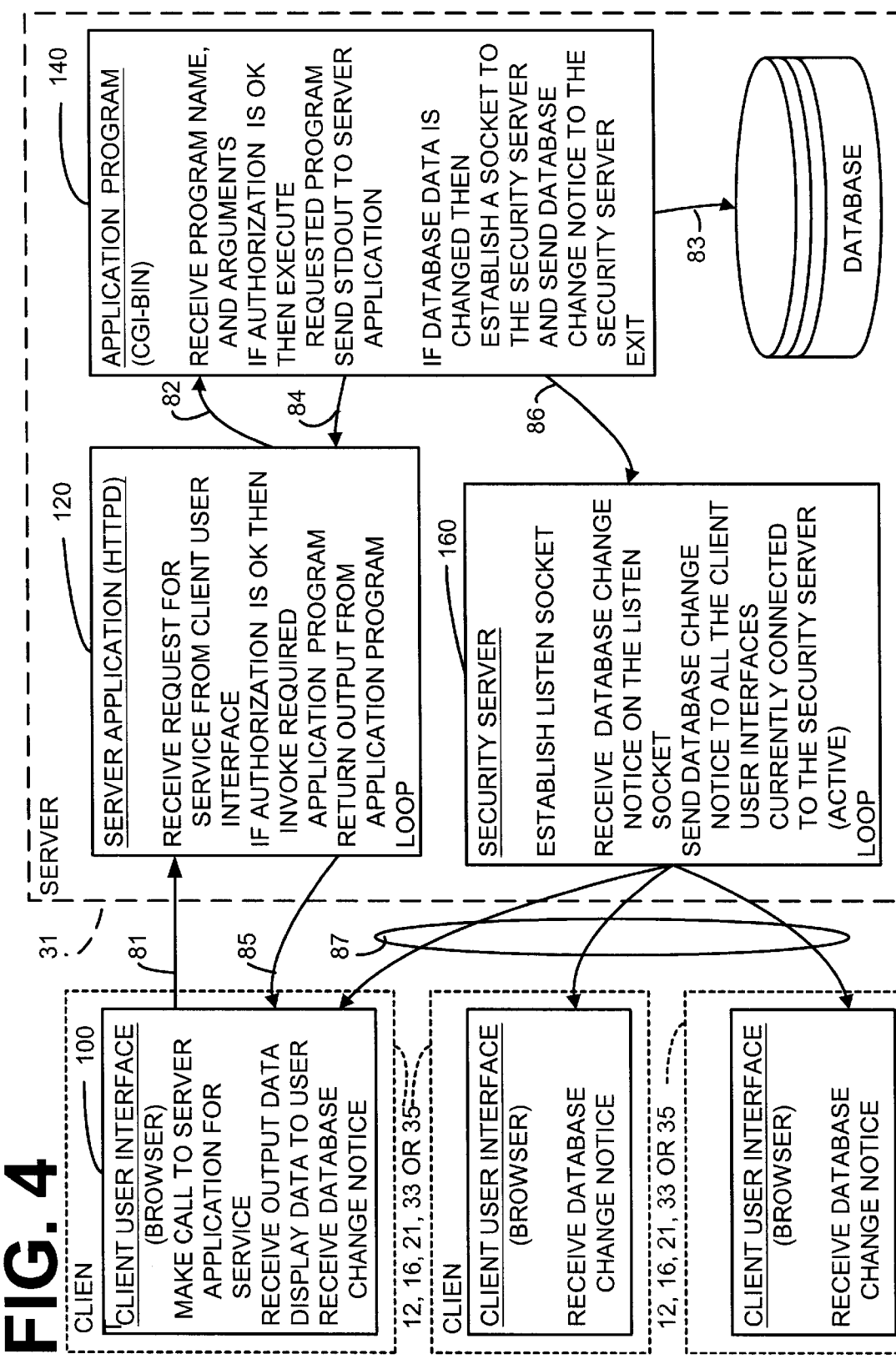
FIG. 4 is a block diagram illustrating the processes and communication traffic between the client browsers, using the server application, CGI-BIN application program, and the security server processes, as shown in FIGS. 2 and 3.

With regard to FIG. 4, the client system 12, 16, 21, 22, 33 or 34 can request services from the Web server 31 by utilizing the client system browser program 100. The browser user interface program first receives a request from the user and checks to make sure that the user is authorized to access a particular function.

Next, the client user interface browser 100 makes a call 81 to the service application for service. This request for service goes out on a network line to the server 31 and is received by the server application 120.

The server application 120 receives a request for service from the client user interface 100. Next, the server application 120 finds the requested program and executes 82 the requested program by invoking CGI-BIN application program 140 using the program name and arguments.

The CGI-BIN application program 140 receives the program name and execution arguments. The CGI-BIN application program 140 checks to verify that the authorization is correct, then executes the requested program to provide the client user browser 100 the requested service. Any database access 83 required is completed. The application program 140 sends the output of the requested program service to the server application 120. The server application 120 receives the output from the application program and returns the output to the client user browser requesting service as shown in item 85.

The application program 140, after returning the output to the server application 120 then checks to see if database data was changed during the execution of the requested program. If database data was changed in access 83, then the application program 140 establishes a communication socket to the security server, and then forwards a database change notice 86 to the security server 160. The security server 160 receives the database change notice 86 on the socket established by the application program 140. The security server 160 checks its sign-on listing of all client user interfaces 100 currently active. Then, the security server 160 sends a database change notice 87 to all client user interfaces 100 that are currently active for further processing.

The browser program 100 then returns the output to the application program that requested service in the client system 12. This process will be further explained hereafter with regard to FIGS. 5–9.

Figure 5:
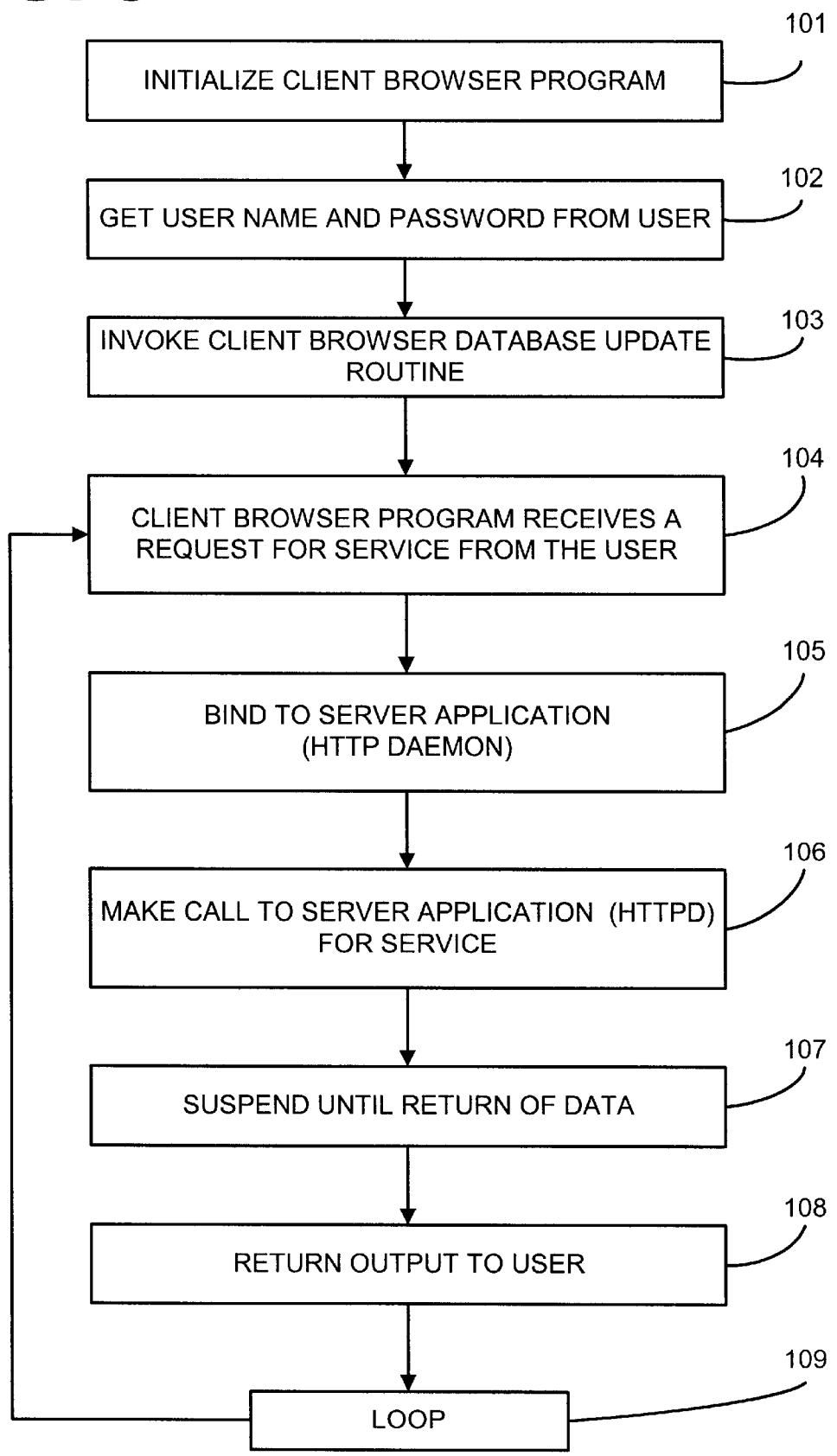
FIG. 5 is a flow chart of the process for the client browser of the present invention, as shown in FIG. 4.

The process implemented by the browser program 100 in the client system 12 is illustrated in FIG. 5. The first step 101 of the browser program 100 is to initialize the client browser program 100. The browser program 100 accepts the login of the user name and password from the user and creates a connection to the security server 140 at step 102. Browser program 100 invokes the client browser database update routine 180 at step 103. The browser program 100 then waits to receive a request for service from the user at step 104.

When browser program 100 receives the request for service from the user at step 104. The browser program 100 binds to the server application 120 at step 105. The browser program 100 makes a call to the server application 120 at step 106. The user browser program 100 is then suspended until the returning of data at step 107.

When data is returned to the client user interface, the browser program 100 is unsuspended and the browser program 100 returns the data received from server application 120 to the user at step 108. The client user interface browser 100 returns to step 104 and waits for the next request for service from the user.

Figure 6:
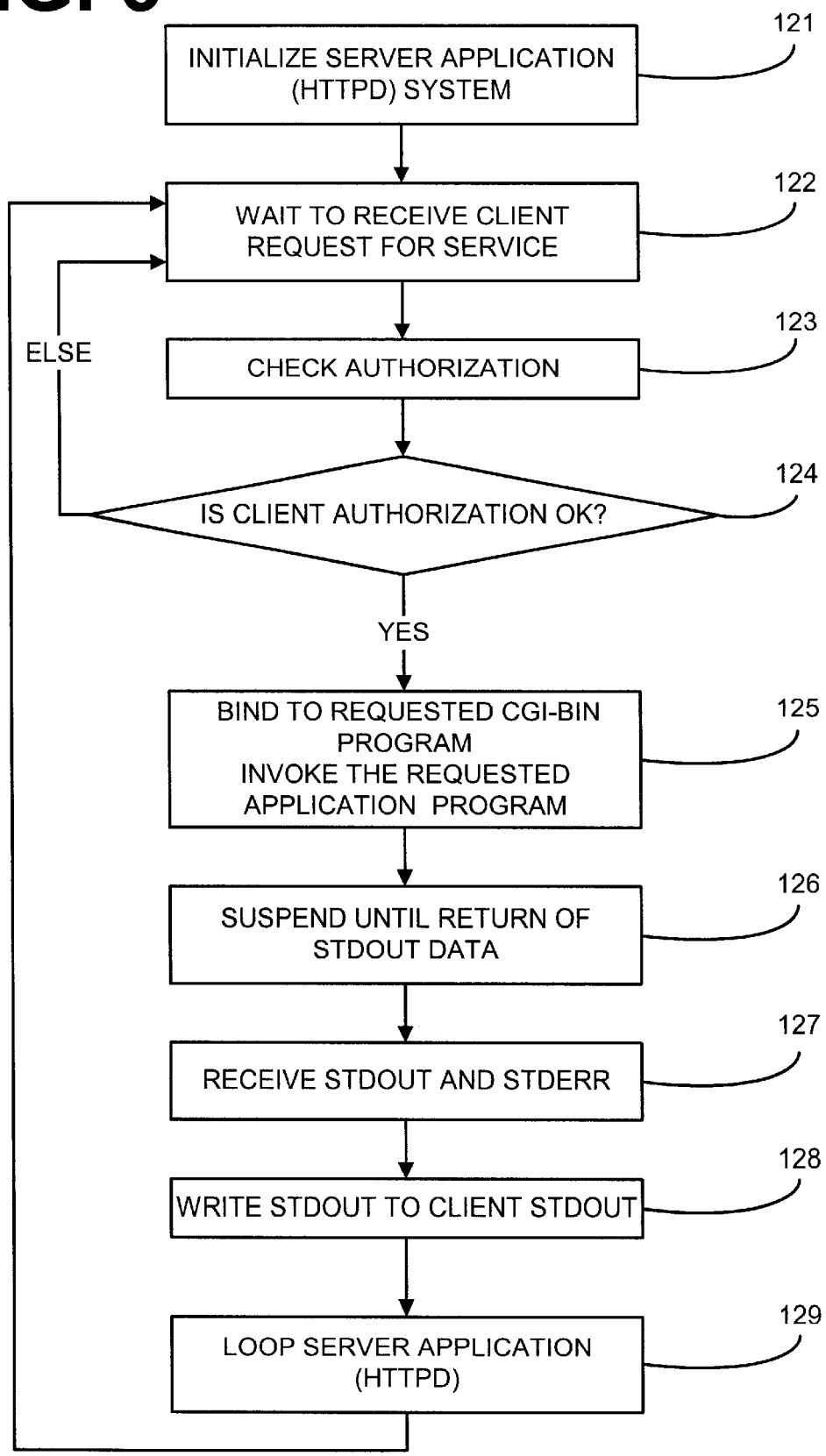
FIG. 6 is a flow chart of the process for the server's server application of the present invention, as shown in FIG. 4.

Illustrated in FIG. 6 is the flow diagram of the architecture and process implemented by the server application 120. The server application 120 is initialized at step 121. The server application 120 waits to receive a client request for service at step 122.

When a client request is received at step 122, the server application 120 checks if the client user interface 100 making the request is authorized to access the requested resource at step 123. If the authorization check is okay, then the server application 120 determines which application program 100 will provide the services requested by the client system. The server application 120 binds to the specified CGI-BIN application program 140 and invokes the specified CGI-BIN application 140 with the specified arguments and sends the necessary data at step 125. The server application 120 process is suspended at step 126, until data is received from the specified CGI-BIN application 140.

When the output is received from the specified CGI-BIN application program 140, the server application 120 receives the output at step 127. The server application 120 prepares the output received from the CGI-BIN application 140 and returns that output to the client requesting service at step 128. The server application 120 then exits that session, loops back to step 122, and suspends itself until a new request is received.

Figure 7:
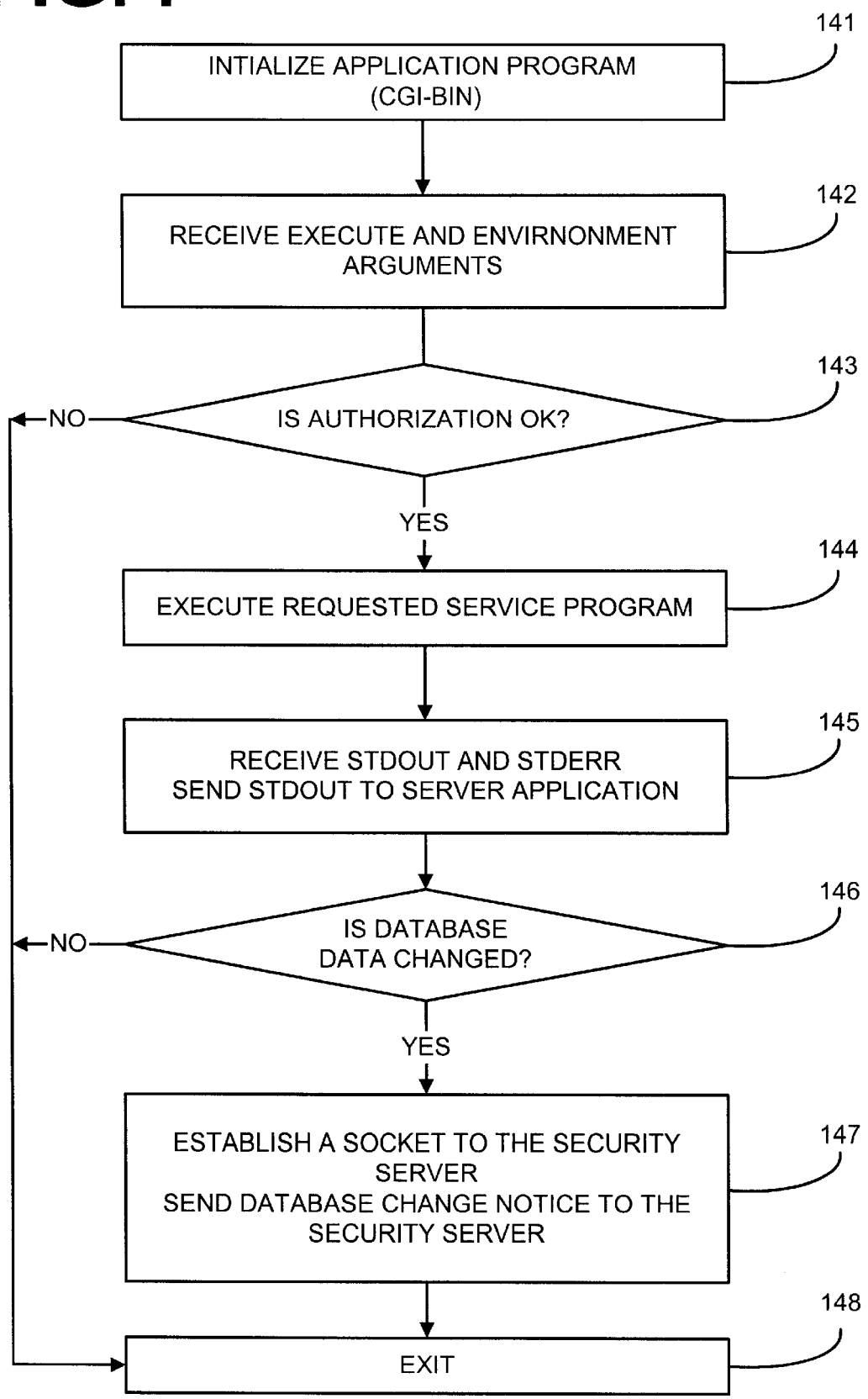
FIG. 7 is a flow chart of the process for the security server program of the present invention, as shown in FIG. 4.

Illustrated in FIG. 7 is the flow diagram for the CGI-BIN application 140. First, the CGI-BIN application program 140 is initialized at step 141. The CGI-BIN application program 140 receives the request for the requested service with the program name and arguments, at step 142. The CGI-BIN application program 140 establishes whether the client user interface requesting the service is authorized to access the service at step 143. If the application program 140 determines that the client user interface 100 was not authorized to access the requested service, then the application program 140 proceeds to step 148 and terminates.

If the client user interface 100 is authorized to access the requested service, the CGI-BIN application program 140 executes the requested service program. After the requested service program is executed at step 144, the CGI-BIN program 140 receives the stdout and standard error messages from the requested service program and sends the stdout and standard error data to the server application 120 at step 145.

Next, the application program 140 checks to see if database data was changed at step 146. If no database change has occurred, the application program 140 proceeds to step 148 and terminates.

If the application program 140 determines that database data was changed, then the application program 140 establishes a socket to the security server and sends a database change notice to the security server at step 147. In the preferred embodiment, a TCP/IP socket is established. Once the database change notice is sent to the security server 160, the application program closes the socket established to the security server 160 and exits at step 148.

Figure 8:
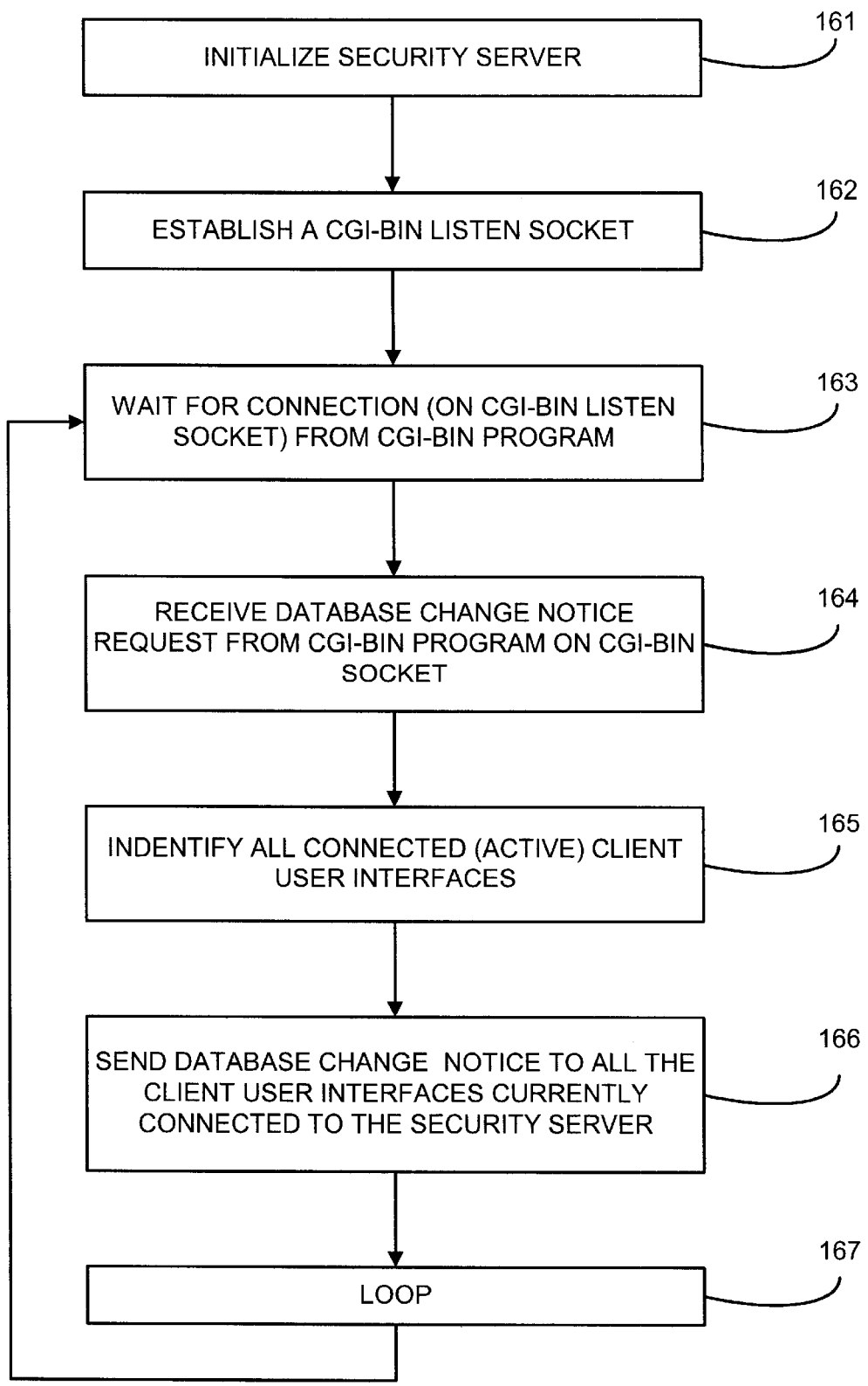
FIG. 8 is a flow chart of the process for the CGI-BIN program process of the present invention, as shown in FIG. 4.

With regard to FIG. 8 illustrated is shown the process of the security server 140. First, the security server 160 is initialized at step 161. Next, the security server 160 establishes a CGI-BIN application program 140 listen socket at step 162. The security server 160 then waits for connection to a CGI-BIN application program 140 on the listen socket established at step 162.

When a connection is made to a CGI-BIN application program 140, the security server 160 receives a database change notice request 86 from the CGI-BIN program 140 on the CGI-BIN socket at step 164. The security server 160 then identifies all connected client user interfaces 100 that are currently active at step 165. In the preferred embodiment, the security server 160 determines which client user interfaces are active by checking a listing for all client user interfaces that are currently connected to the security server.

The security server 160 sends a database change notice to all the client user interfaces 100 that are currently identified as active and connected to the security server 160 at step 166. The security server 160 then returns to step 163 to wait until it receives another token from a user client interface 100.

Figure 9:
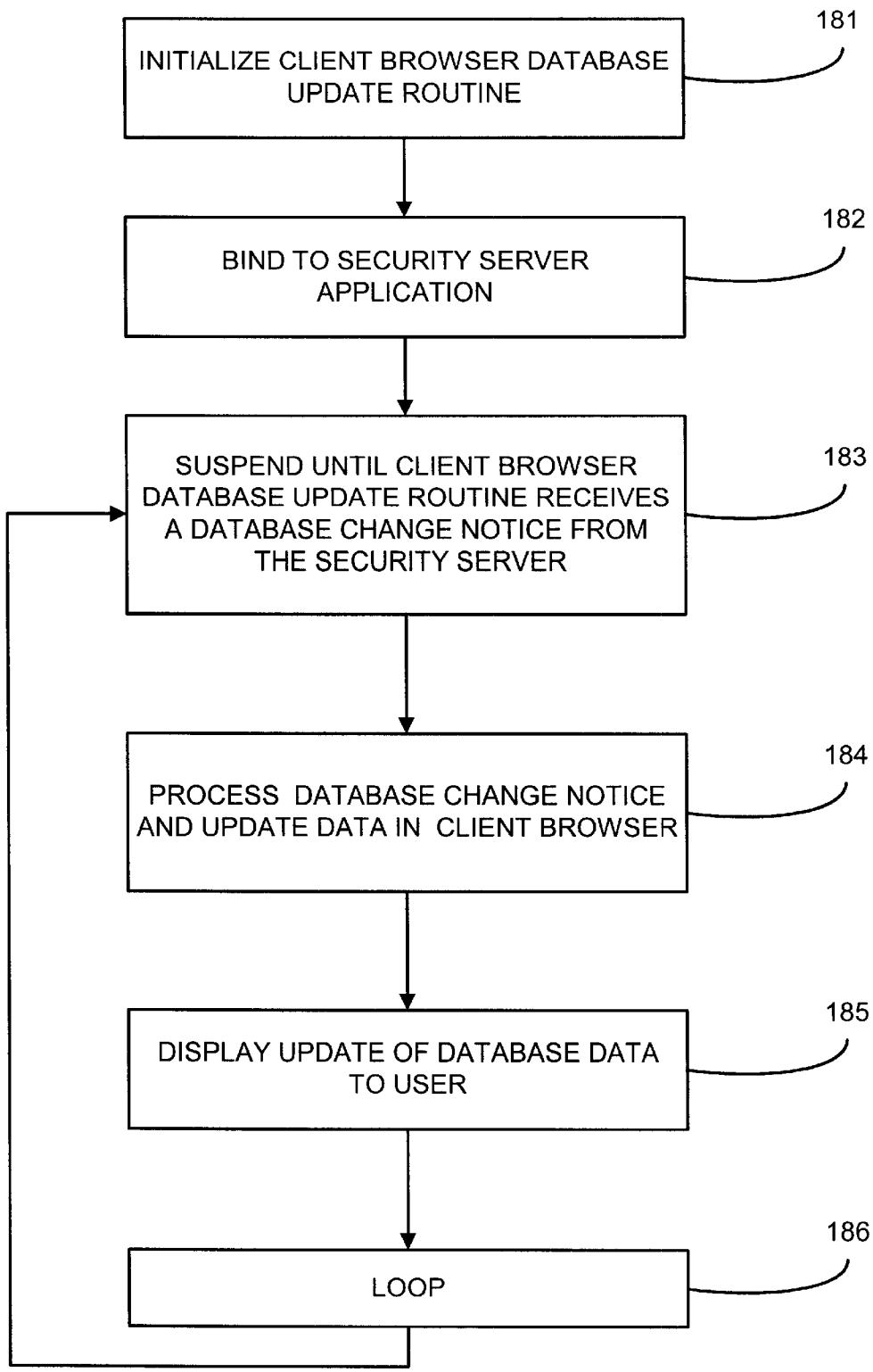
FIG. 9 is a flow chart of the database update routine in the client browser of the present invention, as shown in FIG. 4.

Illustrated in FIG. 9 is the diagram for the client browser database update routine 180. The client browser database update routine 180 is part of the client user browser 100 in the preferred embodiment. First, the client browser database update routine is initialized at step 181. The client browser database update routine binds to the security server 160 at step 182. The client browser database update routine 180 suspends all processing until the client user browser update routine receives a database change notice from the security server 160.

Upon receipt of a database change notice from the security server 160, the client browser database update routine then processes the database change notice and updates any occurrence of the data changed in the client browser at step 184. The client browser database update routine 180 can display a message to the user that an update of database data has occurred at step 185. The client browser database update routine 180 then returns to step 183 and waits for the next database change notice to be received from security server 160.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing flexible communications of data modification of network resources between a plurality of browsers, the method comprising the steps of:

receiving a request for service from one of the plurality of browsers;

performing the request for service;

generating a database change notice if database data accessible to the plurality of browsers was modified while performing the request for service; and transmitting the database change notice to a security server for retransmission to the plurality of browsers.

2. The method of claim 1, further including the step of:

determining if the database data, accessible to the plurality of browsers, was modified while performing the request for service.

3. A method for providing flexible communications of data modification of network resources between a plurality of browsers, the method comprising the steps of:

receiving a sign-on request from a client browser;

adding the client browser to a list of currently connected client browsers;

receiving a database change notice from an application server if database data accessible to the plurality of browsers was modified by the client browser; and retransmitting the database change notice to the plurality of browsers.

4. The method of claim 3, further including the step of:

determining the client browsers that are currently connected.

5. The method of claim 4, wherein the determining currently connected client browsers step further includes the step of:

checking the list of currently connected client browsers.

6. An application apparatus for providing flexible communications of data modification of network resources between a plurality of client browsers, comprising:

means for receiving a request for service from one of the plurality of browsers;

means for performing the request for service;

means for generating a database change notice if database data accessible to the plurality of browsers was modified while performing the request for service; and means for transmitting the database change notice to a security server for retransmission to the plurality of browsers.

7. The application apparatus of claim 6, further comprising:

means for determining if the database data, accessible to the plurality of browsers, was modified while performing the request for service.

8. A security server apparatus for providing flexible communications of data modification of network resources between a plurality of client browsers, comprising:

means for receiving a sign-on request from a client browser;

means for adding the client browser to a list of currently connected client browsers;

means for receiving a database change notice from an application server if database data accessible to the plurality of browsers was modified by the client browser; and means for retransmitting the database change notice to the plurality of browsers.

9. The security server apparatus of claim 8, further comprising:

means for determining a plurality of active browsers.

10. The security server apparatus of claim 9, wherein the active browsers determining means further comprises:

means for checking the list of currently connected client browsers.

11. An application apparatus for communication of data modifications of network resources between a plurality of browsers, comprising:

a first application mechanism that receives a request for service from one of the plurality of browsers;

a second application mechanism that provides the requested service to the one of the plurality of browsers;

a third application mechanism that generates a database change notice if database data accessible to the plurality of browsers was modified; and a fourth application mechanism that transmits the database change notice to a security server for retransmission to the plurality of browsers.

12. The application apparatus of claim 11, further comprising:

a fifth application mechanism that determines if the database data, accessible to the plurality of browsers, was modified while performing the request for service.

13. A security server for communication of data modifications of network resources between a plurality of browsers, comprising:

a first security server mechanism that receives a sign-on request from a client browser;

a second security server mechanism that adds the client browser to a list of currently connected client browsers;

a third security server mechanism that receives a database change notice from an application server if database data accessible to the plurality of browsers was modified by the client browser; and a fourth security server mechanism that retransmits the database change notice to the plurality of browsers.

14. The security server of claim 13, further comprising:

a fifth security server mechanism that determines a plurality of active browsers by checking the list of currently connected client browsers.

* * * * *